US008989493B1

United States Patent
Huang

(10) Patent No.: US 8,989,493 B1
(45) Date of Patent: Mar. 24, 2015

(54) METHOD AND APPARATUS FOR IDENTIFYING REGIONS OF AN IMAGE TO BE FILTERED DURING PROCESSING OF THE IMAGE

(71) Applicant: Marvell International Ltd., Hamilton (BM)

(72) Inventor: Ying Huang, Boise, ID (US)

(73) Assignee: Marvell International Ltd., Hamilton (BM)

(*) Notice: Subject to any disclaimer, the term of this patent is extended or adjusted under 35 U.S.C. 154(b) by 102 days.

(21) Appl. No.: 13/752,657

(22) Filed: Jan. 29, 2013

Related U.S. Application Data

(60) Provisional application No. 61/595,538, filed on Feb. 6, 2012.

(51) Int. Cl.
G06K 9/00 (2006.01)
G06T 5/00 (2006.01)

(52) U.S. Cl.
CPC .................... *G06T 5/001* (2013.01)
USPC .......................... 382/181; 382/173

(58) Field of Classification Search
None
See application file for complete search history.

(56) References Cited

U.S. PATENT DOCUMENTS

| | | | | |
|---|---|---|---|---|
| 4,577,235 A | * | 3/1986 | Kannapell et al. | 358/462 |
| 5,293,430 A | * | 3/1994 | Shiau et al. | 382/173 |
| 5,566,255 A | * | 10/1996 | Pavlidis | 382/317 |
| 5,768,403 A | * | 6/1998 | Suzuki et al. | 358/2.1 |
| 5,784,488 A | * | 7/1998 | Kuwata | 382/176 |
| 6,078,697 A | * | 6/2000 | Ng | 382/275 |
| 6,707,951 B1 | * | 3/2004 | Suzuki et al. | 382/260 |
| 6,718,059 B1 | * | 4/2004 | Uchida | 382/176 |
| 2004/0017579 A1 | * | 1/2004 | Lim | 358/1.9 |
| 2004/0042677 A1 | * | 3/2004 | Lee | 382/254 |
| 2005/0281463 A1 | * | 12/2005 | Yi | 382/173 |
| 2007/0146794 A1 | * | 6/2007 | Ahmed et al. | 358/3.06 |
| 2008/0123945 A1 | * | 5/2008 | Andrew et al. | 382/164 |

OTHER PUBLICATIONS

Srihari, Sargur N. "Document image understanding." Proceedings of 1986 ACM Fall joint computer conference. IEEE Computer Society Press, 1986.*
Fletcher, Lloyd A., and Rangachar Kasturi. "A robust algorithm for text string separation from mixed text/graphics images." Pattern Analysis and Machine Intelligence, IEEE Transactions on 10.6 (1988): 910-918.*
Shih, Frank Y., et al. "A document segmentation, classification and recognition system." Systems Integration, 1992. ICSI'92., Proceedings of the Second International Conference on. IEEE, 1992.*

* cited by examiner

*Primary Examiner* — Li Liu

(57) ABSTRACT

Embodiments of the present disclosure include methods, apparatuses, and systems for identifying regions to be filtered during processing of an image. A map generator is configured to receive pixels of an image and to determine a map for the image. The map indicates a number of islands within blocks of pixels of the image, where individual ones of the islands include either a single dark pixel, or two or more contiguous dark pixels, bordered by light pixels and/or one or more edges of the blocks of pixels. An index generator sets, based at least on the number of islands within the individual ones of the blocks of pixels that correspond to regions of the scanned image, filter indices for the regions of the scanned image. An image filter component, based on the filter indices, filters the regions of the scanned image.

16 Claims, 8 Drawing Sheets

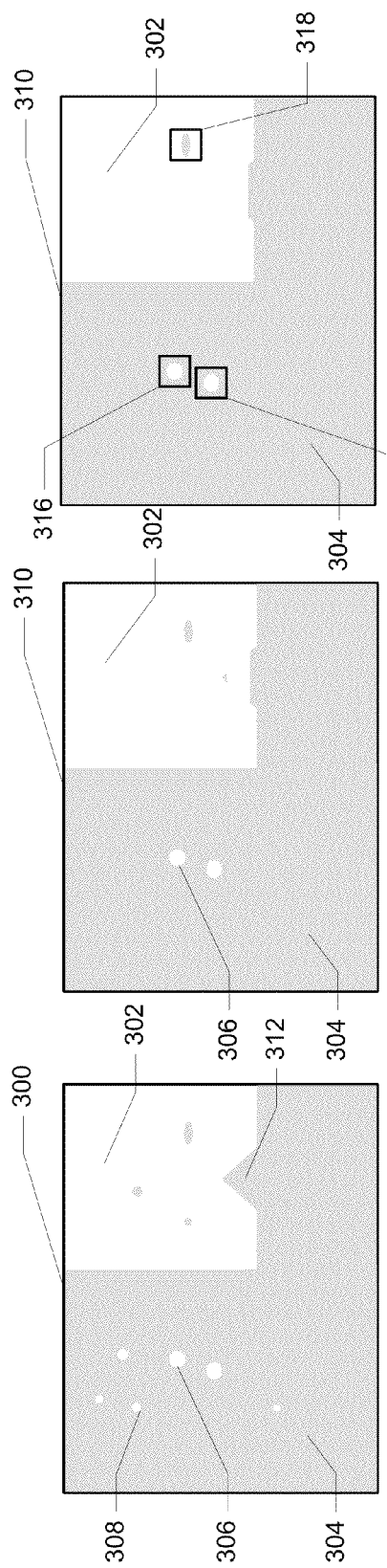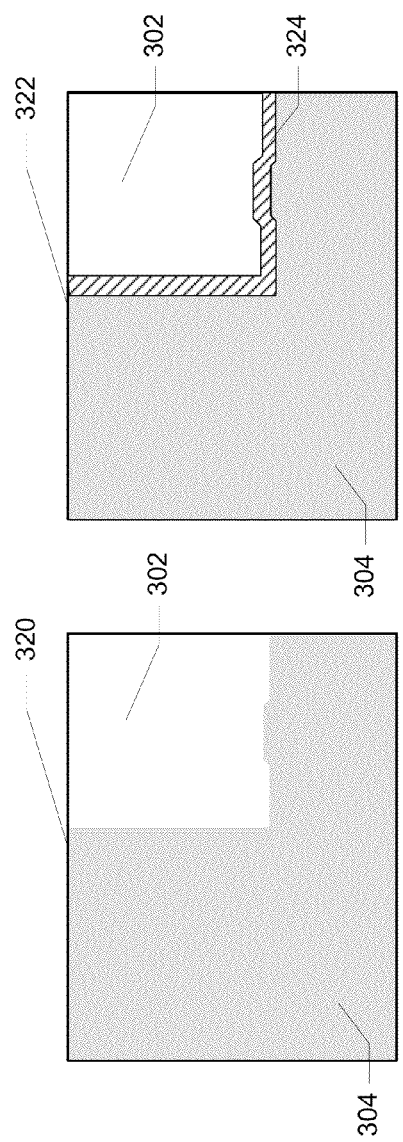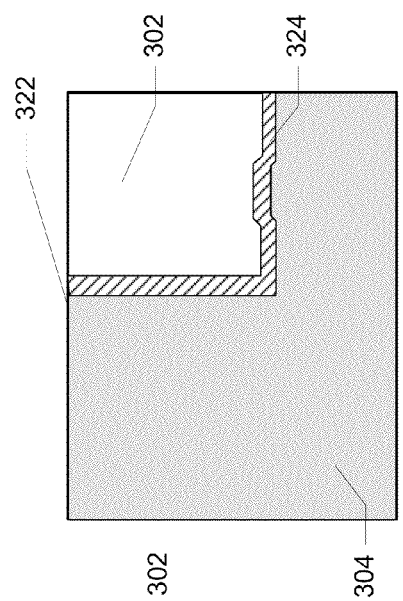
Fig. 3A Fig. 3B Fig. 3C Fig. 3D Fig. 3E

METHOD AND APPARATUS FOR IDENTIFYING REGIONS OF AN IMAGE TO BE FILTERED DURING PROCESSING OF THE IMAGE

CROSS REFERENCE TO RELATED APPLICATIONS

This application claims priority to U.S. Provisional Patent Application No. 61/595,538, filed on Feb. 6, 2012, incorporated herein by reference.

TECHNICAL FIELD

Embodiments of the present disclosure relate to the field of image processing, and in particular to selective filtering of different regions of an image.

BACKGROUND

The background description provided herein is for the purpose of generally presenting the context of the disclosure. Work of the presently named inventors, to the extent that it is described in this background section, as well as aspects of the description that may not otherwise qualify as prior art at the time of filing, are neither expressly nor impliedly admitted as prior art against the present disclosure.

Scanned images can be smoothed or sharpened using an image filter in order to improve image quality. Scanned half-tone images—images that simulate continuous tone imagery by using dots of varying size, tone, shape, and spacing—are improved by smoothing. But scanned text documents and continuous tone (contone) images—images with contiguous dots that cause the appearance of a continuous tone—can be improved by sharpening. Image smoothing reduces differences between adjacent dots, essentially filtering out high frequency components in the image, in order to generate a smoother image. Image sharpening amplifies high-frequency components in the image in order to increase the detail of the image. A conventional scanner application allows the user to control image processing settings—sharpening or smoothing—based on the type of image being scanned.

But some images have multiple region types, such as regions that are half-tone, regions that are contone, and regions that are text. And using a single filter setting on such documents results in filter mismatch on some regions, a loss of data, and reduced image quality. This is especially true of images that are scanned, printed, and then scanned again.

SUMMARY

Embodiments of the present disclosure include a system comprising a map generator configured to receive pixels of an image and to determine a map for the image. The map indicates a number of islands within blocks of pixels of the image, where individual ones of the islands include either a single dark pixel, or two or more contiguous dark pixels, that are bordered by light pixels and/or one or more edges of the blocks of pixels. The system includes an index generator configured to, based at least on the number of islands within the individual ones of the blocks of pixels that correspond to regions of the scanned image, set filter indices for the regions of the scanned image. An image filter component, based on the filter indices, filters the regions of the scanned image.

Embodiments of the present disclosure include a method in which raw image data, including pixels of an image, are received. A map of the image is generated, in which the map is based on a number of islands within subsets of pixels, and wherein ones of the islands include either a single dark pixel or two or more contiguous dark pixels bordered entirely by one or more of light pixels or edges of the subsets of pixels. Based at least on the number of islands within the individual ones of the subsets of pixels as indicated by the map, filter indices are set for individual ones of the subsets of pixels. Filtering regions of the image based on the filter indices are set for the subsets of the pixels that correspond to the regions.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments herein are illustrated by way of example and not by way of limitation in the figures of the accompanying drawings.

FIGS. 3A-E illustrate island maps according to various processing steps utilized to generate a filter index for an image.

DETAILED DESCRIPTION

As noted above, sharpening or smoothing scanned images that have different regions—such as contone regions, half-tone regions, and text regions—often results in reduced image quality for one or more of the regions. Embodiments of the present disclosure include devices, systems, and techniques for identifying region types within a scanned image and selectively applying filtering on those regions. Blocks of pixels within the image are categorized based on the number of pixel islands—sets of contiguous dark spots within the image—within the blocks to create an island map of the scanned image. A half-tone region of the scanned image is likely to have relatively many islands, because dark spots will be scattered throughout a half-tone region with light spots in between. A contone or text region will likely have relatively fewer islands, because dark spots in the contone or text region are more likely to be contiguous. Thus, a characterization of the number of islands in a region of an image provides a metric that can be used to distinguish half-tone regions of an image from contone and text regions of the image. De-noising and removal of small isolated regions from the island map are performed. The island map is then converted to a filter matrix, with identified half-tone regions having a smoothing filter index, and contone and text regions having a sharpening filter index. Border areas between different regions are given a filter index gradient that results in gradually transitioning from sharpening to smoothing in order to improve the overall image quality of the border areas.

These techniques are described below with respect to the figures.

Figure 1:
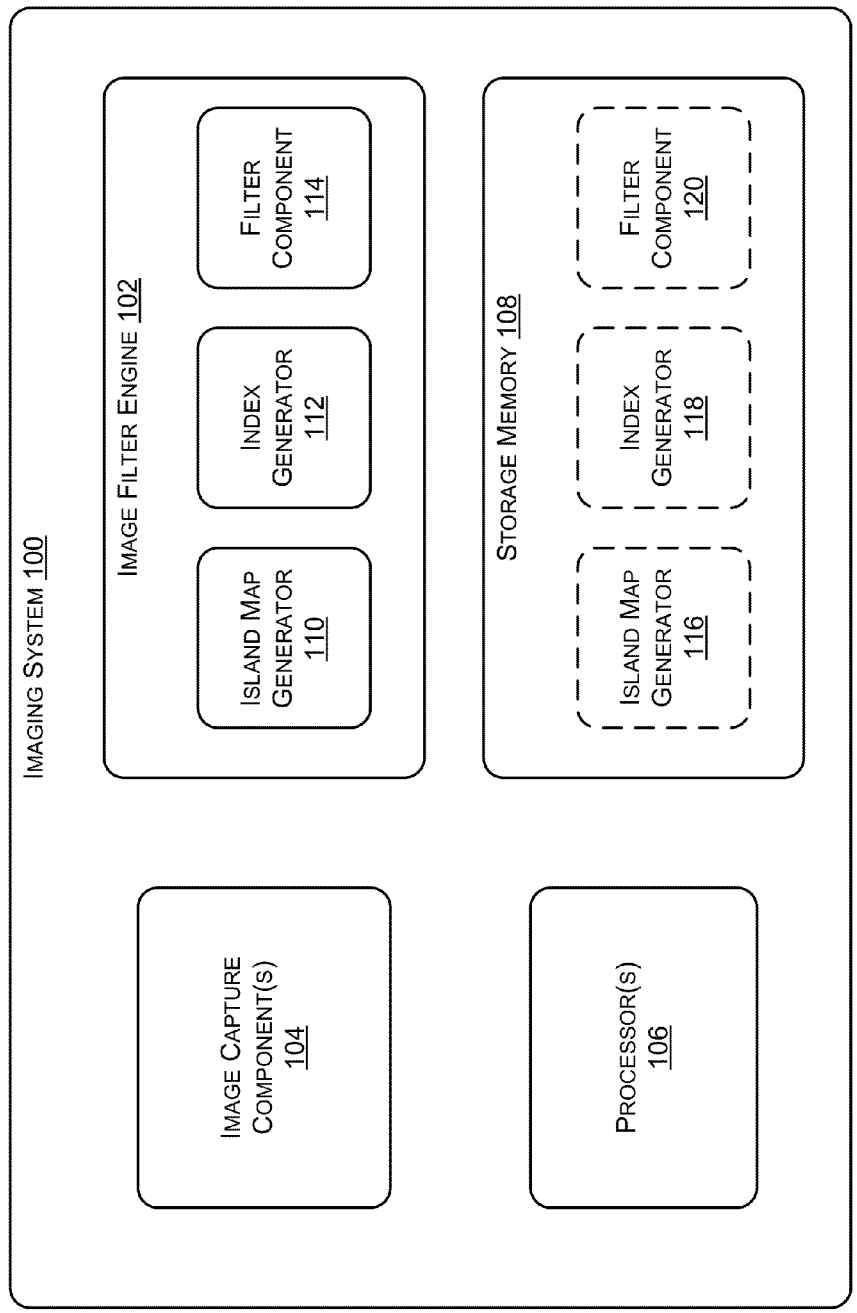
FIG. 1 is a schematic diagram of an imaging system having an image filter engine that identifies different regions in a scanned image and that selectively applies filtering to the different regions.

FIG. 1 is a schematic diagram of an imaging system 100 having an image filter engine 102 that identifies different regions in a scanned image and that selectively applies filtering to the different regions. The imaging system 100 may be a scanner device, digital camera, computing device (such as a desktop computer, laptop computer, smartphone, tablet computer, etc.), or other system that captures images and/or processes images. An image capture component(s) 104 includes one or more of various image capture components, such as light sensors, cameras, and so forth. The image capture component(s) 104 may include a page scanner or copier apparatus, including a mechanism to feed paper past one or more image sensors, a mechanism to convey one or more image sensors over a scanned object, or other devices and apparatuses used for capturing images. Examples of image capture component(s) 104 are well known in the art, and will therefore not be further described herein.

The image filter engine 102 may include one or more integrated circuit components, such as an application-specific integrated circuit (ASIC), field-programmable gate array (FPGA), state machines, or other integrated circuit logic components. The imaging system 100 may also include one or more processor(s) 106, which execute software instructions to perform various functions of the imaging system 100, such as controlling the image capture component(s) 104, transmitting captured images to external devices, receiving user controls of the imaging system 100, and so forth. The software instructions may be included as one or more software modules, programs, operating system components, software libraries, application programming interfaces (APIs), system firmware, and so forth. The software instructions are stored on computer-readable storage memory 108. Storage memory 108 includes one or more of Read-Only Memory (ROM), Random Access Memory (RAM) (such as dynamic RAM, static RAM, magnetoresistive RAM, and so forth), one or more hard disks or other magnetic storage, FLASH memory, or other non-transitory storage memory. One or more components of the software components stored on the storage memory 108 are executed by the one or more processor(s) 106.

Various embodiments of the image filter engine 102 include an island map generator 110, an index generator 112, and a filter component 114. As noted above, the storage memory 108 may include various software components, such as an island map generator 116, an index generator 118, and a filter component 120. In one example, the storage memory 108 includes island map generator 116 and the index generator 118, while the image filter engine includes the filter component 114. In other examples, some aspects of various functions of the imaging system 100 may be performed both in hardware (image filter engine 102) and in software (executing on the one or more processor(s) 106). For example, filter component 114 may perform image filtering under control of the filter component 120. Other examples may be used without departing from the scope of the present disclosure. Embodiments of the present disclosure are not limited to any arrangement or arrangements of hardware and software components to perform the various methods of the present disclosure.

Figure 2:
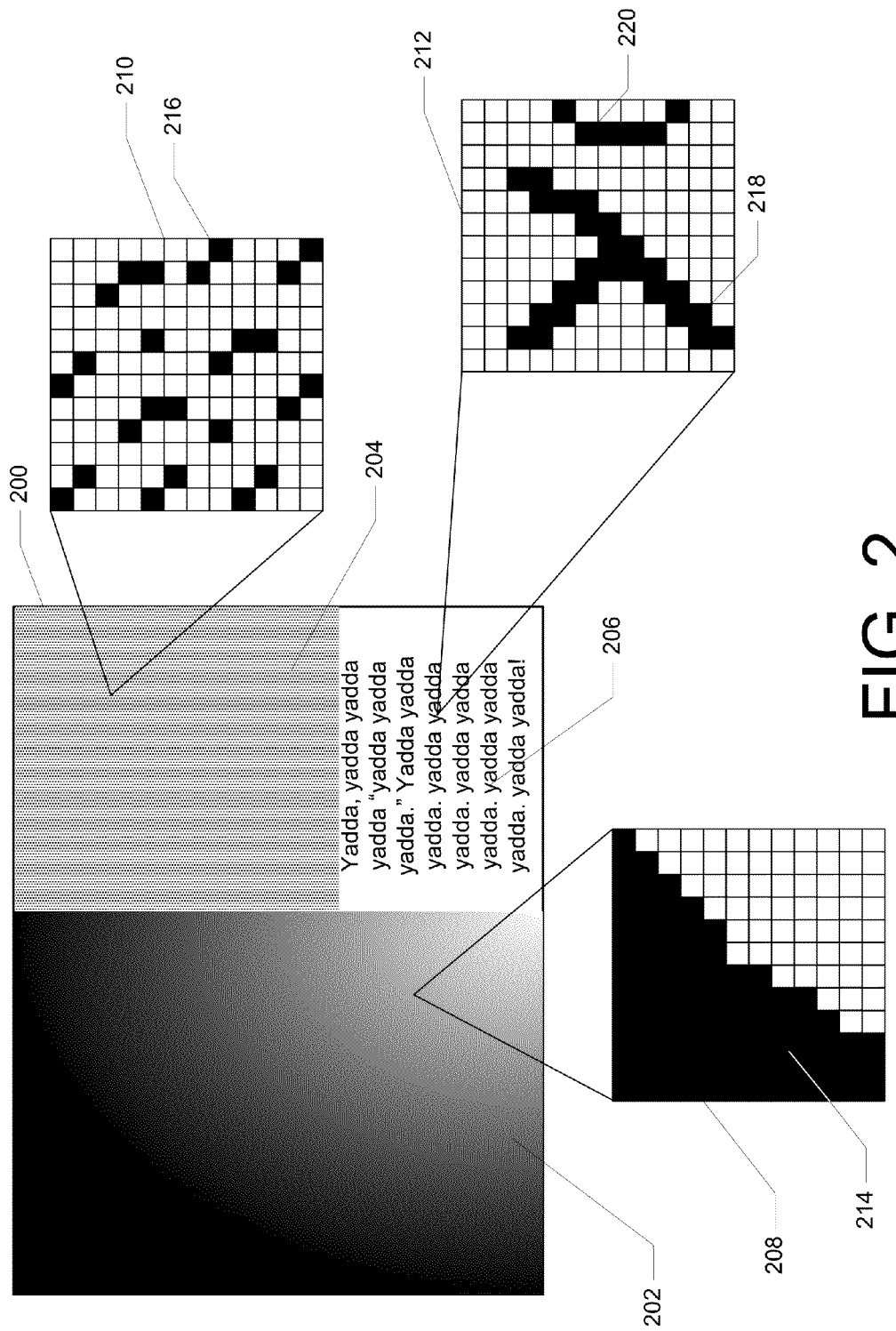
FIG. 2 illustrates an image that has a contone region, a half-tone region, and a text region, and illustrates island identification in blocks of pixels to identify those regions.

FIG. 2 illustrates an image 200 that has a contone region 202, a half-tone region 204, and a text region 206, and that illustrates island identification in blocks of pixels to identify those regions. The island map generator 110 or 116 receives raw image data for the image 200, including pixels of the image 200. The island map generator 110 or 116 determines an island map for the image 200. An island map, examples of which are illustrated in FIGS. 3A-E, indicates a number of islands within each of a block of pixels within the image 200.

To determine the number of islands in a pixel block, the island map generator 110 or 116 establishes which of the pixels within each block of pixels of the image 200 are light pixels and which are dark pixels. A block of pixels includes M×N pixels, where M and N are integers. In the example shown in FIG. 2, the blocks of pixels are 12×12 matrices, although other size blocks of pixels may be used without departing from the scope of embodiments.

To set or establish the pixels within a block of pixels to be light and dark pixels, the island map generator 110 or 116 calculates a mean of the pixel values within a particular block of pixels. The island map generator 110 or 116 then establishes a threshold value based on the mean pixel value for the particular block of pixels, such as by adding the mean value to a bias value to arrive at the threshold. Pixels within a particular pixel block that have values that are greater than the threshold value are set to "dark" pixels, and pixels that have values that are less than the threshold value are set to "light" pixels. The pixel blocks 208, 210, and 212 are shown in FIG. 2 after the island map generator 110 or 116 has set their pixels to either light or dark. Thus, the pixel blocks 208, 210, and 212 illustrated in FIG. 2 do not show the pixels of the image 200 in their original state, but instead show the pixel blocks after the individual pixels therein have been set to either light or dark pixels.

The island map generator 110 or 116 calculates the numbers of pixel islands within the individual pixel blocks. Islands within an individual pixel block include single dark pixels bordered only by light pixels (or the edge of the pixel block) or one or more contiguous dark pixels bordered only by light pixels (or the edge of the pixel block). A connected-dot algorithm is used to count the number of islands of pixels within the pixel blocks. The following Matlab code implements an example connected-dot algorithm, although other software code may be used without departing from the scope of the present disclosure.

```
%z is a dim x dim block from step b
%dim is set to be 12
vector = zeros(dim,1);    %Buffer vector containing current colors
count = 0;                %current number of connected areas
nextToken = 1;            % Next color to use to paint a newly encountered zone
for row = 1: dim
    current = 0;
```

```
        for col = 1: dim      %scan current row for dots
            if x(row,col) == 0
                %Not a dot
                current = 0;       %Mark last scanned pixel is not a dot
            else
                %Here is a dot
                if current ~= 0 && vector(col) ~= 0 && current ~= vector(col)
    %A new dot is found, but it can be painted with two colors, one
    %from the one to its top (vector(col)), one from the one to its
    %left (current). This indicates that two groups can be merged,
    %which also means there are one less connected areas.
    if min([vector(col), current]) ~= current
    %The one from its top has a smaller color, use it
    current = vector(col);
    %Modify the group to its left on the same row to the smaller color
    for k = col-1:-1:1
        if z(row,k) < 1
            break;
        end
        vector(k) = current;
    end
                else
    %Modify the color for the elements in previous line to its right
    t = vector(col);        % Save the current value for comparison
    for k = col:dim
    %If this is from the same group (color)
    if vector(k) == t
        vector(k) = current;
    end
    end
                    end
                    count = count - 1;
                else
                    %Found a new one adjacent to zero or one painted dot
                    current = max([current, vector(col)]);
                    if current == 0
                        %Not adjacent to a painted dot, pick a new color
                        current = nextToken;
                        nextToken = nextToken +1;
                        count = count + 1;
                    end
                end
            end             %End of a pixel
            vector(col) = current;
        end                 %End of a row
    end                     %End all
```

Referring again to FIG. 2, the pixel block 208 includes a single island. Pixel block 208 comes from the contone region 202 of the image 200. Because pixels in a contone region of an image create the appearance of a continuous tone, each individual pixel of the pixel block 208 will tend to vary little from the pixel next to it. The contone region 202 includes a gradual transition from a dark upper left portion to a light lower right portion. Thus, any given block of pixels within contone region 202, such as pixel block 208, has roughly half of its pixels being greater than the mean of the pixels within that pixel block and roughly half of its pixels being less than the mean of the pixels within that pixel block. Thus, a threshold value that is the same as or nearly the same as the mean pixel value for that pixel block results in approximately half of the pixels being set to "dark" pixels by the island map generator 110 or 116 and roughly half of the pixels being set to "light" pixels. Thus, in the example shown in FIG. 2, the pixel block 208 includes a single island 214. The pixels (denoted by the squares in the pixel block 208) have a single group of dark pixels (those pixels that have values that are greater than the mean of the pixels of pixel block 208 plus a bias value), bordered only by (i) light pixels (those pixels that have values that are less than the mean of the pixels of pixel block 208 plus a bias value) and (ii) the edge of the pixel block.

In contrast, pixel block 210 includes 12 islands, counting diagonally adjacent dark pixels as contiguous dark pixels, such as with the two pixels of island 216. Pixel block 210 comes from the half-tone region 204 of the image 200. Because a half-tone region tends to include relatively dark pixels spaced apart by relatively light pixels, pixel blocks from half-tone regions will tend to have more islands than pixel blocks from contone regions.

Pixel block 212 includes two islands, island 218 and 220. Pixel block 212 comes from text region 206 of the image 200. Text regions are composed of text features (such as letters, numbers, punctuation, and so forth), and text features are usually composed of large numbers of contiguous dark pixels surrounded by, and enclosing, light pixels. Pixel blocks in text regions therefore tend to have, like a contone pixel block, relatively fewer islands than pixel blocks from half-tone regions.

The island map generator 110 or 116 therefore determines the number of islands in each pixel block of the image 200 and compares the number of islands to a threshold value (such as, for example a number between 4 and 7, and in particular 5 islands for a 12×12 pixel block). Those pixel blocks that exceed the threshold are more likely than other blocks to be from half-tone regions of the image 200, and thus are given a first designation (for example a binary "1") in an island map and those pixel blocks that have less than the threshold number of islands are more likely than other blocks to be from either contone or text regions of the image 200, and are thus given a second designation (for example a binary "0").

FIGS. 3A-E illustrate island maps according to various processing steps utilized to generate a filter index for an image. In the example island maps shown in FIGS. 3A-E, those pixel blocks having more than a threshold number of islands (those pixels blocks given a "1" designation by the island map generator 110 or 116) are shown as white regions. And those pixels blocks having less than or equal to a threshold number of islands (those pixel blocks given a "0" designation by the island map generator 110 or 116) are shown as grey regions. Use of grey and white, and binary "0" and "1," to designate these regions are just one possible implementation, and are used herein for the purpose of illustration only. In other implementations of the region identification techniques described within this disclosure, other designations may be used such as "1" for contone and text regions and "0" for half-tone regions. Each pixel in the island maps 300, 310, 320, and 322 of FIGS. 3A-E corresponds to a pixel block in the original image, such as the image 200 in FIG. 2. Thus, an island map will be a fraction of the size of the original image. For example, where a pixel block is a 12×12 block of pixels, a corresponding island map will be $\frac{1}{12}$th the size of the original image.

Island map 300 of FIG. 3A includes multiple regions, such as regions 302, 304, 306, and 308. Some of the regions, such as the region 308, may be noise that results from a scanning process. Other regions, such as the region 306, are too small to be meaningful from an image filtering standpoint. Thus, the island map generator 110 or 116 performs de-noising and small isolated region removal on the island map 300.

Island map 310 of FIG. 3B shows the island map after de-noising is performed. The island map generator 110 or 116 implements de-noising by averaging the pixel blocks of the island map 310 over a group of pixel blocks, such as a 3×3 group of pixel blocks. The groups of pixel blocks with a mean or summation value greater than or equal to a threshold (for example, a summation greater than or equal to six) are kept. The summation is the total number of islands found in the nine blocks of a 3×3 group of pixel blocks. In some embodiments, a mean value is used, wherein the mean equals the summation for the group of pixel blocks divided by the number of blocks in the group. In embodiments where the block count is fixed, summation is used which is a suitable substitute for a mean value in those cases, assuming that the threshold is adjusted to account for the use of a summation rather than an average (e.g., a summation threshold will generally be larger than a threshold used if average values are calculated). A summation will also be an integer, which may be desirable. In other embodiments, other spatial filters such as a Gaussian smoothing operator may also be used to de-noise the island map.

The de-noising of the island map may result in some but not all small regions of the image being removed from the island map. For example, region 308 is removed from the island map 310. And a portion of the triangle-shaped area 312 of region 304 is removed based on the de-noising. Because de-noising is not perfect, some noise may remain present, such as the remaining portion of the triangle-shaped area of region 304.

Even with de-noising, some regions within the island map, such as region 306, are still present in the island map but are too small to be meaningful from a filtering perspective. Also, a small region located inside a larger area with a different type may be the result of incorrect identification from an island generation process, and it is desirable to eliminate such regions. Thus, the island map generator 110 or 116 performs a small isolated region removal process that results in such areas being removed or merged with their surrounding larger areas.

One way to perform the small isolated region removal is to identify regions that fit within a pixel block area of a predetermined size, such as for example 30×30 pixel blocks or other size. In embodiments, the size is decided primarily based on the resolution of the original image and further adjusted based on testing results obtained from a set of target images. Any such areas that include a region of a first subset of pixel blocks that are (i) of a first type (either a "1" or a "0" as characterized by the island map generator 110 or 116), and that are (ii) completely bounded by a second subset of pixel blocks that are of a different type (a "1" if the first subset is a "0" or a "0" if the first subset is a "1") within the area are removed. This is represented in FIG. 3C by the areas 314, 316, and 318. The small isolated regions within these areas include a first subset of pixel blocks that are completely bounded by a second subset of pixel blocks of the opposite type, and the island map generator 110 or 116 removes these small isolated regions, and merges these portions of the island map with their larger surrounding areas. Examples of small isolated region removal are described in more detail below in the description of FIGS. 4 and 5.

FIG. 3D illustrates island map 320 after both de-noising and small isolated region removal. Island map 320 includes regions 302 and 304, with the other regions removed or merged with their surrounding regions.

The index generator 112 or 118 creates a filter index for the image based on the island map, with half-tone regions of the island map provided smoothing filter indices and contone/text regions of the island map provided sharpening filter indices. But an abrupt transition from smoothing in one region of an image (such as in region 302) to sharpening in an adjacent region of the region (such as in region 304) often results in unattractive border effects between the regions with different processing. The island map generator 110 or 116 identifies border areas between the regions, and sets a filter gradient across the border area that smoothly transitions from sharpening to smoothing.

FIG. 3E illustrates island map 322, having border area 324, for which the index generator 112 or 118 sets a gradient of filters that gradually transitions from a sharpening filter index for the pixel blocks of region 304 to the smoothing filter index for the pixel blocks of region 302. Examples of border identification and setting filter indices within the border area are illustrated below with respect to FIG. 6.

Figure 4:
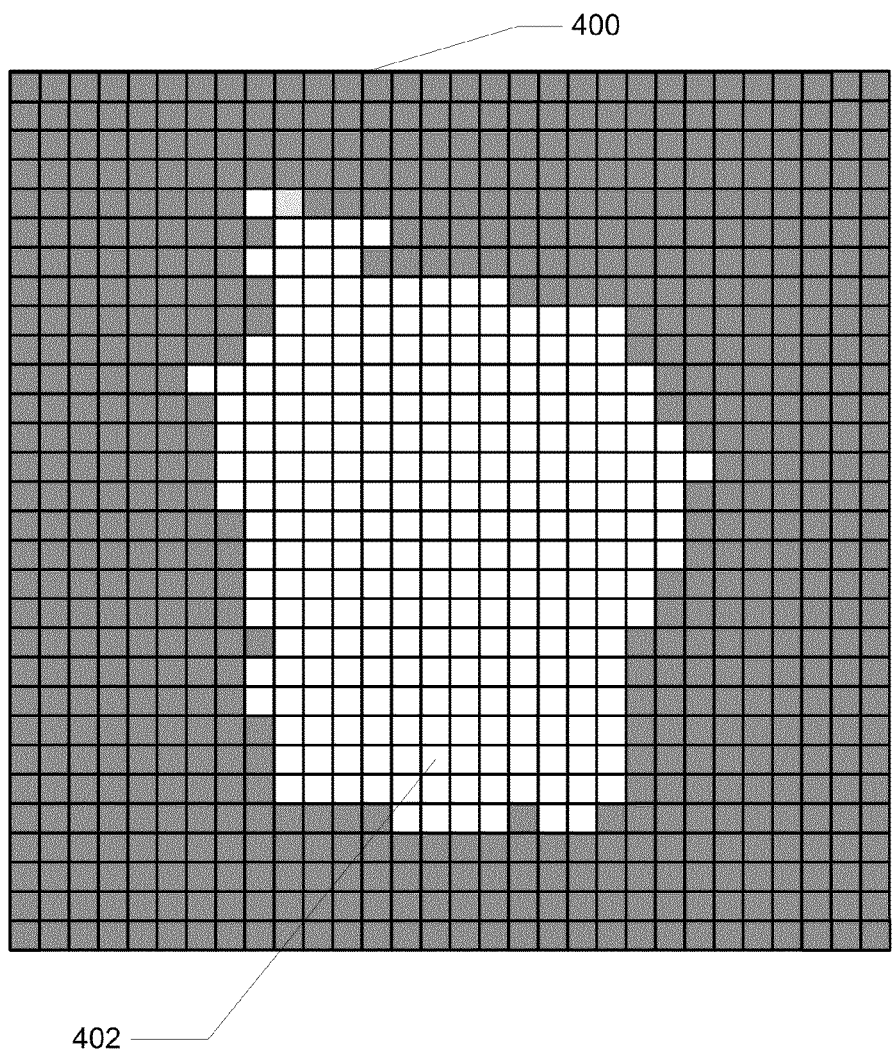
FIG. 4 illustrates a small region of an island map that is removed during small isolated region removal.

FIG. 4 illustrates a small region of an island map that is removed during small isolated region removal. The island map generator 110 or 116 identifies regions that completely fit within an area of a predetermined size, such as an area with 30×30 pixel blocks in the island map. Area 400 of FIG. 4 is a 30×30 area of pixel blocks of an island map. Region 402 is a half-tone region, and the surrounding pixels are part of a larger contone or text region of the island map. Because the region 402 is completely enclosed by grey pixel blocks (pixel blocks of a different type than the pixel blocks of region 402) within the area 400, the island map generator 110 or 116 identifies region 402 as a small isolated region and sets all pixel blocks within region 402 to be the same pixel block type as the surrounding pixel blocks—in this example, the region 402 is set or re-categorized to be a contone or text region. This occurs even though its pixel blocks have a number of islands that exceeds the threshold number of islands for designating a pixel block as being a contone or text region. Thus, when setting the filter matrix for the island map, the index generator 112 or 118 sets the pixel blocks within the region 402 to have a sharpening index filter (unless one or more pixel blocks within the region 402 are part of a border area as will be described in more detail below), instead of a smoothing filter index, as would be normally applied to a half-tone region of an island map.

Figure 5:
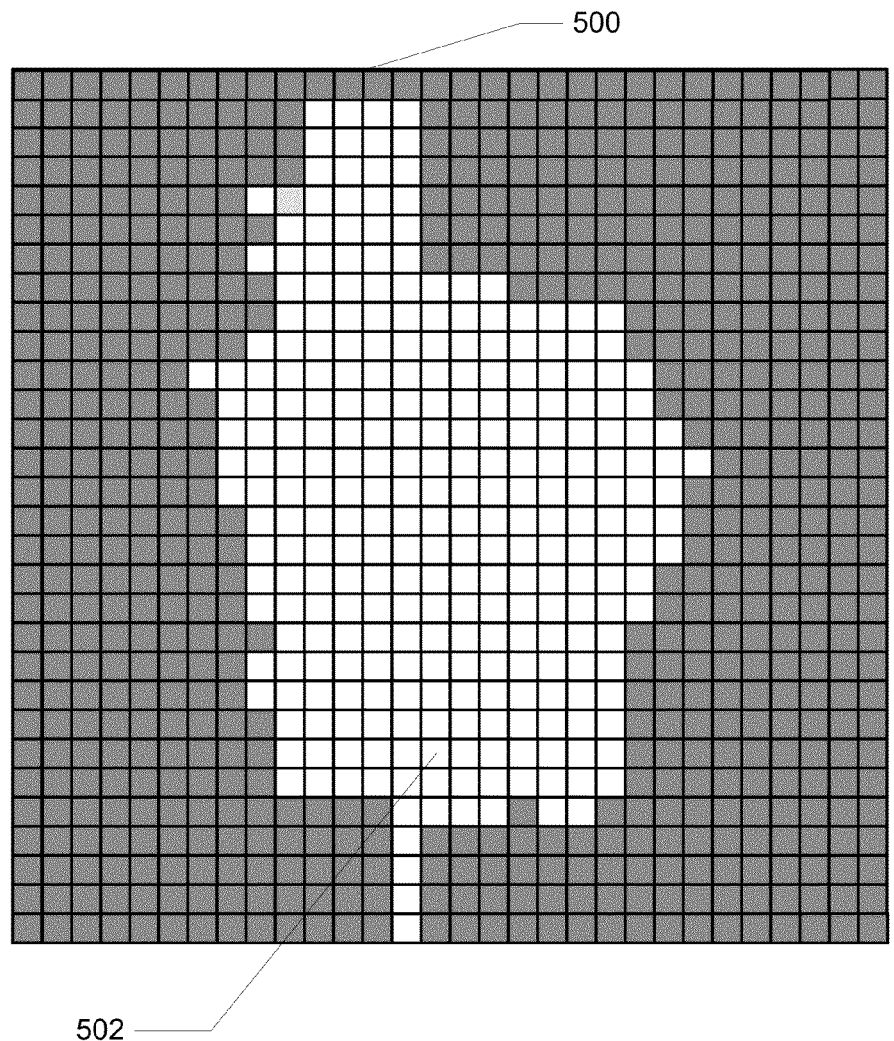
FIG. 5 illustrates a small region of an island map that is not removed during small isolated region removal.

FIG. 5 illustrates a small region of an island map that is not removed during small isolated region removal. Area 500 of FIG. 5 is a 30×30 area of pixel blocks of an island map. Region 502 is a half-tone region, and the surrounding pixels are part of a larger contone or text region of the island map. Because the region 502 is not completely enclosed by grey pixel blocks within the area 500, the island map generator 110 or 116 does not identify region 502 as a small isolated region and therefore retains all pixel blocks within region 502 to be their original type. In other words, region 502 is considered to be at least the minimum size to be considered meaningful from a filtering perspective. Thus, the index generator 112 or 118 sets the pixel blocks within the region 502 to have a smoothing filter index, as would be normally applied to a half-tone region of an island map.

Although the examples illustrated in FIGS. 4 and 5 are of half-tone regions surrounded by contone or text regions, small isolated region removal operates in the same or similar fashion where contone or text regions are surrounded by half-tone regions.

As noted above, border areas between regions of different types in the island map are identified in order to smooth the transition between smoothing and sharpening adjacent regions within the image. The result is improved image quality at the transition areas. The index generator 112 or 118 identifies a "0" pixel block (e.g., a contone or text pixel block, as characterized based on the number of islands within the pixel blocks) that is within a certain distance to a "1" pixel block (e.g., a half-tone pixel block, as characterized based on the number of islands within the pixel blocks). One technique to do this is illustrated with respect to FIG. 6.

Figure 6:
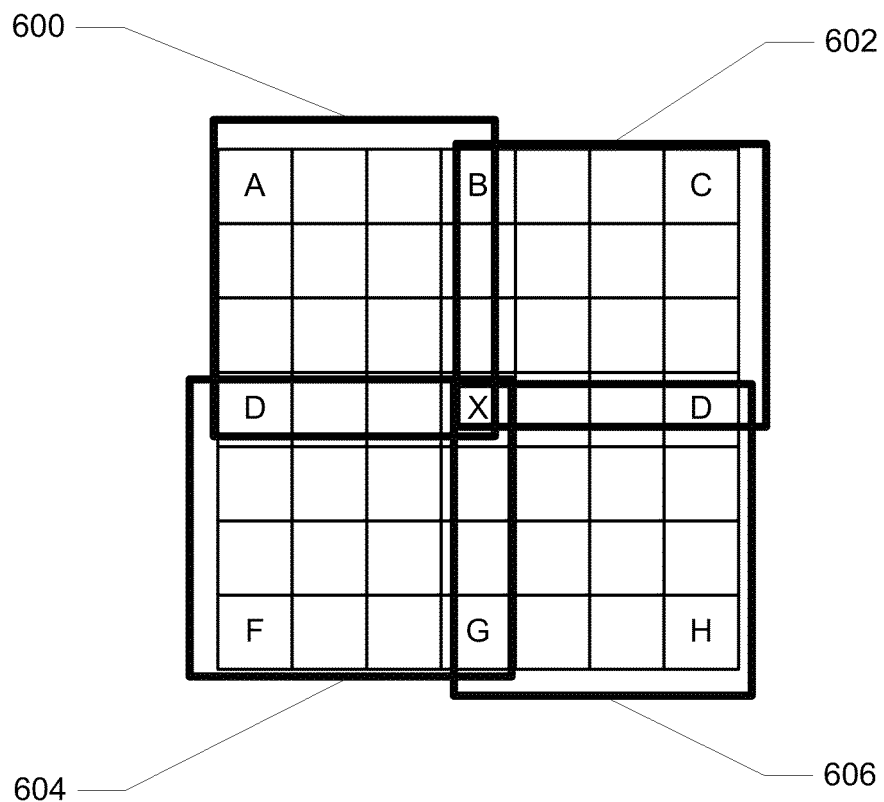
FIG. 6 illustrates identification of a border area within an island map.

FIG. 6 illustrates identification of a border area within an island map. A "1" pixel block—pixel block "X" in FIG. 6—is identified, and if any of the eight pixel blocks labeled A-H in FIG. 6 are "0" pixel blocks, then the pixel block X is considered to be within a border area. The index generator 112 or 118 counts the number of "0" pixel blocks in each of the four square boxes 600, 602, 604, and 606 (having pixel blocks X, D, G, and H at its four corners). The maximum of the four counts of "0" pixel blocks within square boxes 600, 602, 604, and 606 is used to determine a smooth/sharpening filter index number. For example, if box 600 includes five "0" pixel blocks, square box 602 includes eight "0" pixel blocks, box 604 includes two "0" pixel blocks, and box 606 includes ten "0" pixel blocks, then the number ten is used to determine the smooth/sharpening filter index number for pixel block X.

In one example, the maximum of the counts of the "0" pixel blocks in the square boxes 600, 602, 604, and 606 is used to determine a filter index number. In this example, because each of the square boxes 600, 602, 604, and 606 include at least "1" pixel block (the X pixel block) and at least one "0" pixel block (at least one of A, B, C, D, E, F, G, and H pixel blocks), the maximum count will be between one "0" pixel block and fifteen "0" pixel blocks. Thus, in this example, the filter index will be a number between zero (0) and sixteen (16), with a 0 filter index number in an output matrix indicating maximum sharpening, and a 16 filter index number in an output matrix indicating maximum smoothing. Pixel blocks in the border area will have a filter index between 0 and 16 (i.e., 1-15), and the closer a border area pixel block is to a "0" pixel block in the island map, the closer to 0 its index number will be, and the closer a border area pixel block is to a "1" pixel block in the island map, the closer to 16 its index number will be. Thus, the index generator 112 or 118 will create a gradient of filter indices across a border area to smooth out the transition from smoothing to sharpening in order to improve image quality in the border area.

Although the above example described with respect to FIG. 6 includes looking for a "1" pixel block that is within a certain range of at least one "0" pixel block, other embodiments could instead start out by looking for "0" pixel blocks that are within a certain range of a "1" pixel block. Also, some embodiments may use a different algorithm besides a summation to determine the filter indices for pixel blocks in the border areas of the island map.

Figure 7:
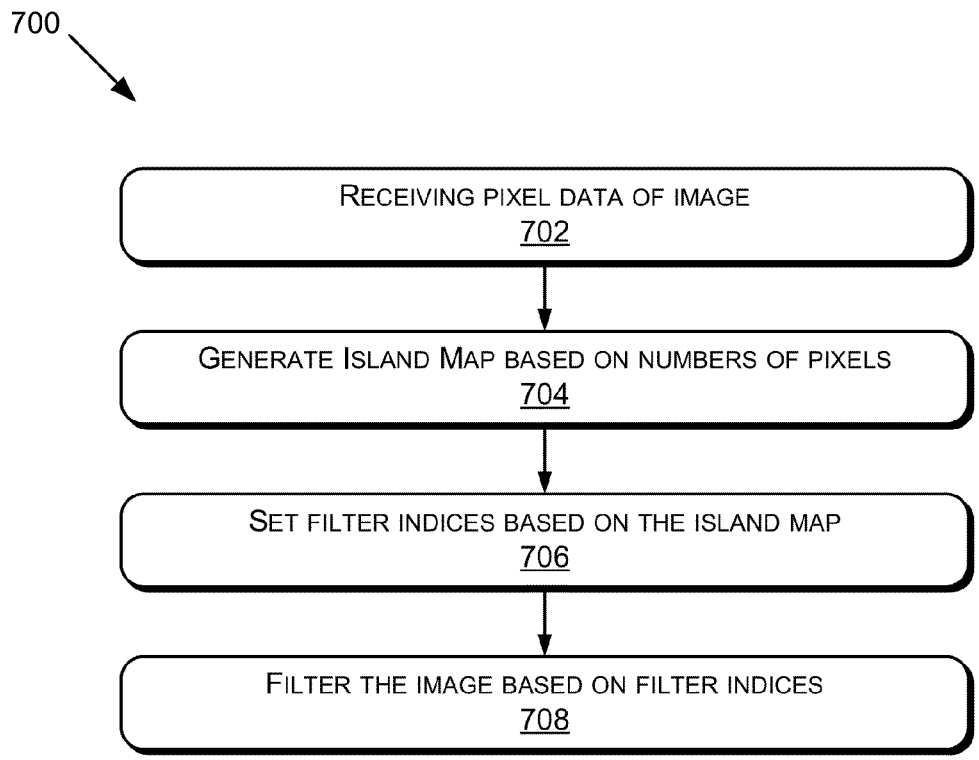
FIG. 7 is a flowchart showing an example process for identification of regions within an image and selective filtering of the image based on the selective identification.

FIG. 7 is a flowchart showing an example process 700 for identification of regions within an image and selective filtering of the image based on the selective identification. At 702, pixel data of an image, such as a scanned image or an image to be printed, is received. At 704, an island map generator, such as the island map generator 110 or 116, generates an island map based on a number of islands within subsets of pixels of the image. The islands include either (i) a single dark pixel bordered entirely by light pixels or (ii) two or more contiguous dark pixels bordered entirely by light pixels.

At 706, an index generator, such as the index generator 112 or 118, sets filter indices for subsets of pixels based on the island map. In an example, the filter indices include a sharpening filter index for contone and text regions of the image and a smoothing filter index for the half-tone regions of the image. In an example, the filter indices include a filter index gradient across a border region between two regions of the image that are of different types, such as between a half-tone region and a contone or text region. In an example, the filter indices are output in the form of a filter matrix.

At 708, a filter component, such as the filter component 114 or 120, filters the image based on the filter indices, such as based on a filter matrix. The filter component applies sharpening filtering to regions of the image that are identified as contone or text regions, as indicated in the filter matrix, and smoothing filtering to regions of the image that are identified as half-tone regions, as indicated in the filter matrix.

Figure 8:
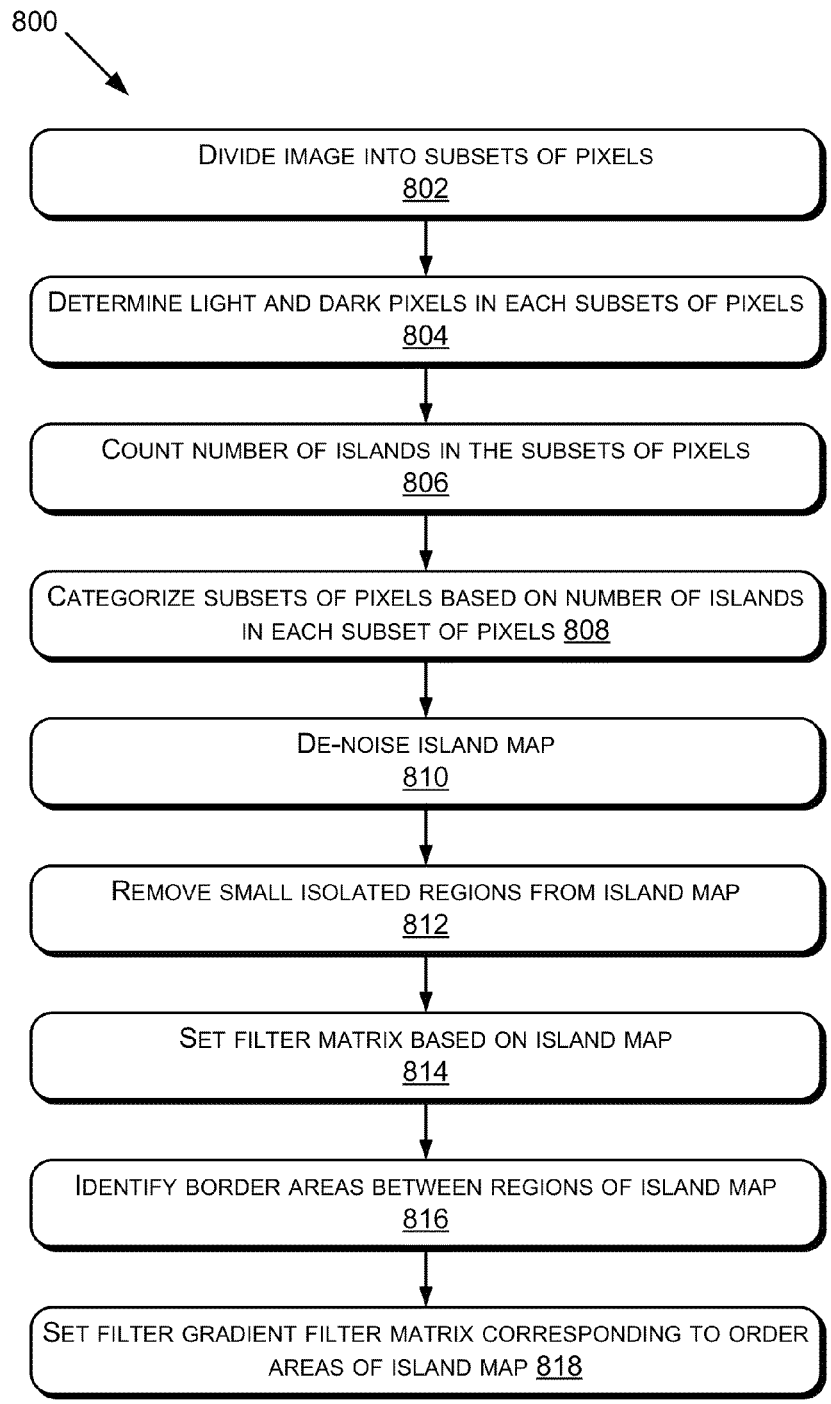
FIG. 8 is a flowchart showing an example process for generating an island map and filter matrix.

FIG. 8 is a flowchart showing an example process 800 for generating an island map and filter matrix. At 802, an island map generator, such as the island map generator 110 or 116, divides an image into pixel blocks or subsets of pixels. The pixel blocks, or more generally subsets of pixels, have a uniform size, such as for example 12×12 pixels, or other size.

At 804, the island map generator determines those pixels within the subsets of pixels that are dark pixels, and those pixels that are light pixels. In embodiments, for a particular subset of pixels, this is accomplished based on a comparison of values of the pixels in the subsets of pixels to corresponding thresholds. The corresponding thresholds are determined at least in part based on mean values of the pixels in the subsets of pixels. In a particular example, the threshold is a mean value of the subset of pixels added to a bias value.

At 806, the island map generator counts a number of islands in each subset of pixels. An island is a single dark pixel, or a contiguous group of dark pixels, that are completely bounded or surrounded by (i) light pixels and/or (ii) the edge of the subset of pixels.

At 808, the island map generator categorizes the individual ones of the subsets of pixels based on whether the individual ones of the subsets of pixels include at least a threshold number of islands (such as 5, 6, or 7 islands, or other number of islands), and wherein the setting the filter indices for the individual ones of the subsets of pixels is based at least on the categorizing of the individual ones of the subsets of pixels.

Pixel blocks that have less than a threshold number of pixels are more likely than other pixel blocks to be part of a contone or text region of the island map, and is categorized as being part of a region of the island map whose corresponding image region is to be sharpened. A pixel block that meets or exceeds a threshold number of pixels is more likely than other regions of the island map to be a half-tone region of the island map, and is categorized as being part of a region of the island map whose corresponding region of the island is to be smoothed. A binary "0" may be set for the regions that have fewer than the threshold number of islands and a binary "1" may be set for the regions that meet or exceed the threshold number of islands. Other indications besides binary "0" and "1" are used in other embodiments.

At 810, the island map is de-noised, such as by averaging the pixel blocks of the island map over a 3×3 group of pixel blocks, or other group size. The pixel blocks with a summation greater than or equal to a threshold (for example 6) are kept.

At 812, the island map generator removes small isolated regions from the map, such as by identifying a portion of the island map that includes a first group of the subsets of pixels that (i) includes only subsets of pixels that are of the same type, and (ii) is completely bounded by a second group of the subsets of pixels that are of an opposite type, wherein the portion of the island map contains a predetermined number of pixels. Small isolated regions are merged with their larger surrounding regions, and thus set to the same categorization as their larger surrounding regions.

At 814, the index generator sets a filter matrix for regions of the island map to either a smoothing filter index or a sharpening filter index. Thus, regions of the island map categorized as a binary "1" (where binary "1" indicates pixel subsets or blocks that have at least a threshold number of islands, and are thus relatively likely to be half-tone regions), including those areas of the island map that are set to "1" based on de-noising and small isolated region removal, are given a smoothing filter index. And regions of the island map categorized to a binary "0" (where binary "0" indicates pixel subsets or blocks that have fewer than a threshold number of island, and are thus relatively likely to be contone or text regions), including those areas of island map that are set to "0" based on de-noising and small isolated region removal, are given a sharpening filter index.

At 816, the index generator identifies a boundary between regions of the image. This is based, for example, on whether a pixel block in the island map is within a certain distance of a pixel block of a different categorization or type.

At 818, the index generator sets a filter gradient across the boundary area to smoothly transition from sharpening to smoothing. For example, the filter index for a particular pixel block in the boundary area is set to an intermediate filter index (such as between 1-15) that is between a smoothing index (such as 16) and a sharpening index (such as 0), based on the number of the types of each kind of pixel blocks that are near to the particular pixel block.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Operations of processes 700 and 800 can be suitably combined and may comport with techniques and/or configurations described in connection with various embodiments.

For the purposes of the present disclosure, the phrase "A/B" means A or B. For the purposes of the present disclosure, the phrase "A and/or B" means "(A), (B), or (A and B)." For the purposes of the present disclosure, the phrase "at least one of A, B, and C" means "(A), (B), (C), (A and B), (A and C), (B and C), or (A, B and C)." For the purposes of the present disclosure, the phrase "(A)B" means "(B) or (AB)" that is, A is an optional element.

The description uses the phrases "in an embodiment," "in embodiments," or similar language, which may each refer to one or more of the same or different embodiments. Furthermore, the terms "comprising," "including," "having," and the like, as used with respect to embodiments of the present disclosure, are synonymous.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This disclosure is intended to cover any adaptations or variations of the embodiments discussed herein. Therefore, it is manifestly intended that embodiments described herein be limited only by the claims and the equivalents thereof.

What is claimed is:

1. A system comprising:
   at least one integrated circuit configured to:
      receive pixels of an image;
      divide the image into a plurality of blocks of pixels;
      determine numbers of islands within each of the plurality of blocks of pixels of the image, wherein determining a particular number of islands within a particular block of the plurality of blocks includes identifying at least one of
         a single dark pixel bordered by at least one of (i) a plurality of light pixels of the particular block and (ii) one or more edges of the particular block, or
         two or more contiguous dark pixels bordered by at least one of (i) a plurality of light pixels of the particular block and (ii) one or more edges of the particular block;
      determine categorizations of each of the plurality of blocks of pixels based on the numbers of islands within each of the plurality of blocks of pixels; and
      set, based at least on the categorizations of each of the plurality of blocks of pixels, filter indices for regions of the image, each of the regions including different subsets of the plurality of blocks of pixels; and
   filter based on the filter indices, the regions of the image.

2. The system of claim 1, wherein the integrated circuit is further configured to receive the image from an image capture component.

3. The system of claim 1, wherein the integrated circuit is further configured to, based on comparisons of values of the pixels of the particular block to a threshold value, wherein the threshold value is a function of a mean value of the pixels of the particular block, determine:
   (i) which of the pixels within the particular block are dark pixels, and
   (ii) which of the pixels within the particular block are light pixels.

4. The system of claim 3, wherein the threshold value is calculated by adding the mean value to a bias value.

5. The system of claim 1, wherein:
the integrated circuit is further configured to:
based on whether each of the plurality of blocks of pixels has more than a threshold number of islands, determine the categorizations.

6. The system of claim 1, wherein the integrated circuit is further configured to reduce a number of the regions within the image, based on one or more of (i) de-noising of the image or (ii) merging at least one of the regions within the image that is (A) less than a predetermined size and (B) surrounded by a larger surrounding region.

7. The system of claim 1, wherein the map integrated circuit is further configured to:
identify an area within the image that includes a first subset of the blocks of pixels, the first subset of the blocks of pixels being
  (i) categorized as a first type of block based on corresponding numbers of islands within each of the first subset of blocks of pixels, and
  (ii) bounded by a second subset of blocks of pixels that are categorized as being a second type of block based on corresponding numbers of islands within each of the second subset of blocks of pixels; and
  wherein the area of the map contains no more than a predetermined number of blocks of pixels; and
set the first subset of the blocks to be the second type of block.

8. The system of claim 1, wherein the integrated circuit is further configured to:
identify a boundary area between at least two areas of the image; and
set a filter index gradient across the boundary area to transition from (A) sharpening a first region of the image to (B) smoothing a second region of the image.

9. The system of claim 1, wherein the integrated circuit is further configured to set
a smoothing filter index for a first block of pixels that has more than a threshold number of islands; and
a sharpening filter index for a second block of pixels that has fewer than the threshold number of islands.

10. A method, comprising:
receiving pixels of an image;
dividing the image into a plurality of blocks of pixels;
determining numbers of islands within each of the plurality of blocks of pixels, wherein determining a particular number of islands within a particular block of the plurality of blocks includes identifying at least one of
  a single dark pixel bordered by at least one of (i) a plurality of light pixels of the particular block or (ii) one or more edges of the particular block, or
  two or more contiguous dark pixels bordered by at least one of (i) a plurality of light pixels of the particular block or (ii) one or more edges of the particular block;
determining categorizations of each of the plurality of blocks of pixels based on the numbers of islands within each of the plurality of blocks of pixels;
setting, based at least on the categorizations of each of the plurality of blocks of pixels, filter indices for regions of the image, each of the regions including different subsets of the plurality of blocks of pixels; and
filtering, based on the filter indices, the regions of the image.

11. The method of claim 10, further comprising:
determining which pixels of the particular block of pixels are dark pixels, and which pixels of the particular block of pixels are light pixels, based on a comparison of values of the pixels in the particular block of pixels to a threshold value, wherein the threshold value is determined at least in part based on a mean value of the pixels in the particular block of pixels.

12. The method of claim 11, wherein the threshold value is calculated by adding the mean value to a bias value.

13. The method of claim 10, wherein:
the determining the categorizations of each of the plurality of blocks of pixels is based on whether the numbers of islands within each of the plurality of blocks of pixels meets or exceeds a threshold number of islands.

14. The method of claim 10, wherein the setting the filter indices includes:
setting a smoothing filter index for a first block of pixels that includes at least a threshold number of islands; and
setting a sharpening filter index for a second block of pixels that includes less than the threshold number of islands.

15. The method of claim 14, further comprising:
identifying a boundary area between a first region of the image that includes the first block of pixels and a second region of the image that includes the second block of pixels; and
setting a filter gradient across the boundary area to transition from sharpening to smoothing.

16. The method of claim 10, further comprising:
identifying a portion of the image that includes a first region that (i) includes only blocks of pixels that are categorized as a first type, and (ii) is completely bounded by a second region that includes only blocks of pixels that are categorized as a second type; and
setting the first region to be the second type.

* * * * *